(12) United States Patent
Sato et al.

(10) Patent No.: US 7,583,295 B2
(45) Date of Patent: Sep. 1, 2009

(54) IMAGE SIGNAL PROCESSING UNIT

(75) Inventors: Koichi Sato, Saitama (JP); Shinsuke Sanbongi, Tokyo (JP)

(73) Assignee: Hoya Corporation, Tokyo (JP)

( * ) Notice: Subject to any disclaimer, the term of this patent is extended or adjusted under 35 U.S.C. 154(b) by 517 days.

(21) Appl. No.: 11/550,535

(22) Filed: Oct. 18, 2006

(65) Prior Publication Data
US 2007/0097225 A1    May 3, 2007

(30) Foreign Application Priority Data
Oct. 27, 2005    (JP)    ............ P2005-312622

(51) Int. Cl.
H04N 5/228    (2006.01)
H04N 5/235    (2006.01)
G06K 9/36    (2006.01)
(52) U.S. Cl. .......... 348/222.1; 348/229.1; 348/230.1; 382/166
(58) Field of Classification Search .......... 348/222.1, 348/229.1
See application file for complete search history.

(56) References Cited

U.S. PATENT DOCUMENTS

| 6,204,881 | B1 * | 3/2001 | Ikeda et al. | 348/362 |
| 2001/0040628 | A1 * | 11/2001 | Akahori et al. | 348/229 |
| 2004/0169747 | A1 * | 9/2004 | Ono et al. | 348/272 |

FOREIGN PATENT DOCUMENTS

| JP | 11-266403 | 9/1999 |
| JP | 2004-266369 | 9/2004 |
| JP | 2004-363666 | 12/2004 |

OTHER PUBLICATIONS

U.S. Appl. No. 11/553,499 to Sato et al., filed Oct. 27, 2006.
English language Abstract of JP 11-266403.
English language Abstract of JP 2004-266369.
English language Abstract of JP 2004-363666.

* cited by examiner

Primary Examiner—Tuan V Ho
Assistant Examiner—Euel K Cowan
(74) Attorney, Agent, or Firm—Greenblum & Bernstein, P.L.C

(57) ABSTRACT

An image signal processing unit comprising an image signal receiver, a first addition block, a compression block, and a determination block, is provided. The image signal receiver receives an image signal. The image signal is generated by an imaging device. The imaging device has a plurality of pixels generating pixel signal. A receiving surface of the imaging device is divided into a number of pixel blocks. A number of pixels are arranged in the pixel block. The first addition block generates high-sensitivity signal by adding up the pixel signals generated by some pixels arranged at a predetermined position in the pixel block. The compression block generates low-sensitivity signal by compressing the high-sensitivity signal so that the low-sensitivity signal is lower than the maximum signal level of the pixel signal. The determination block determines whether a signal level of the high-sensitivity signal is over the threshold level The low-sensitivity signal is output if the signal level of the high-sensitivity signal is over the threshold level. Alternatively, the high-sensitivity signal is output if the signal level of the high-sensitivity signal is under the threshold level.

8 Claims, 14 Drawing Sheets

IMAGE SIGNAL PROCESSING UNIT

BACKGROUND OF THE INVENTION

1. Field of the Invention

The present invention relates to an image signal processing unit that carries out signal processing on image signals generated by an imaging device.

2. Description of the Related Art

There is a lowest amount of received light for an imaging device to generate pixel signal of a minimum signal strength. If a light amount from an object is under this amount, an optical image of the object cannot be captured well. In the prior art, a method has been known in which pixel signals generated by some pixels in an imaging device are summed and outputted as a summed pixel signal. By summing up pixel signals, the imaging device can capture an optical image of a dark object. However, when summing up some pixel signals, the summed-up pixel signal, generated by some pixels that receive reflected light of a bright object, saturates.

Further, it has been proposed to capture the optical image in long and short exposure times and to carry out some signal processing in order to display an image including dark and bright objects clearly. However, an imaging device designed for such special use is necessary It is still difficult for an ordinary imaging device to display an image including dark and bright objects clearly.

SUMMARY OF THE INVENTION

Therefore an object of the present invention is to provide an image signal processing unit that enables displaying an optical image including dark and bright objects received by an ordinary imaging device clearly.

According to the present invention an image signal processing unit comprising an image signal receiver, a first addition block, a compression block, and a determination block is provided. The image signal receiver receives an image signal. The image signal is generated by an imaging device. The imaging device has a plurality of pixels. The pixel(s) generate pixel signal(s) according to the amount of received light. A receiving surface of the imaging device is divided into a plurality of pixel blocks. A plurality of the pixels are arranged in the pixel block. The first addition block generates a high-sensitivity signal by adding up the pixel signals generated by a plurality of the pixels arranged at a predetermined position in the pixel block. The compression block generates a low-sensitivity signal by compressing the high-sensitivity signal for each of the pixel blocks so that the low-sensitivity signal is lower than a maximum signal level of the pixel signal A signal level of the low-sensitivity signal is higher than a first threshold level. The low-sensitivity signal increases in proportion to increasing the high-sensitivity signal. The determination block determines whether a signal level of the high-sensitivity signal is over the first threshold level.

Further, the compression block generates the low-sensitivity signal by multiplying the high-sensitivity signal by a compression coefficient. The compression coefficient decreases inversely as the signal level of the high-sensitivity signal increases.

Further, the compression block generates the low-sensitivity signal by compressing the high-sensitivity signal when the signal level of the high-sensitivity signal is over the first threshold level.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
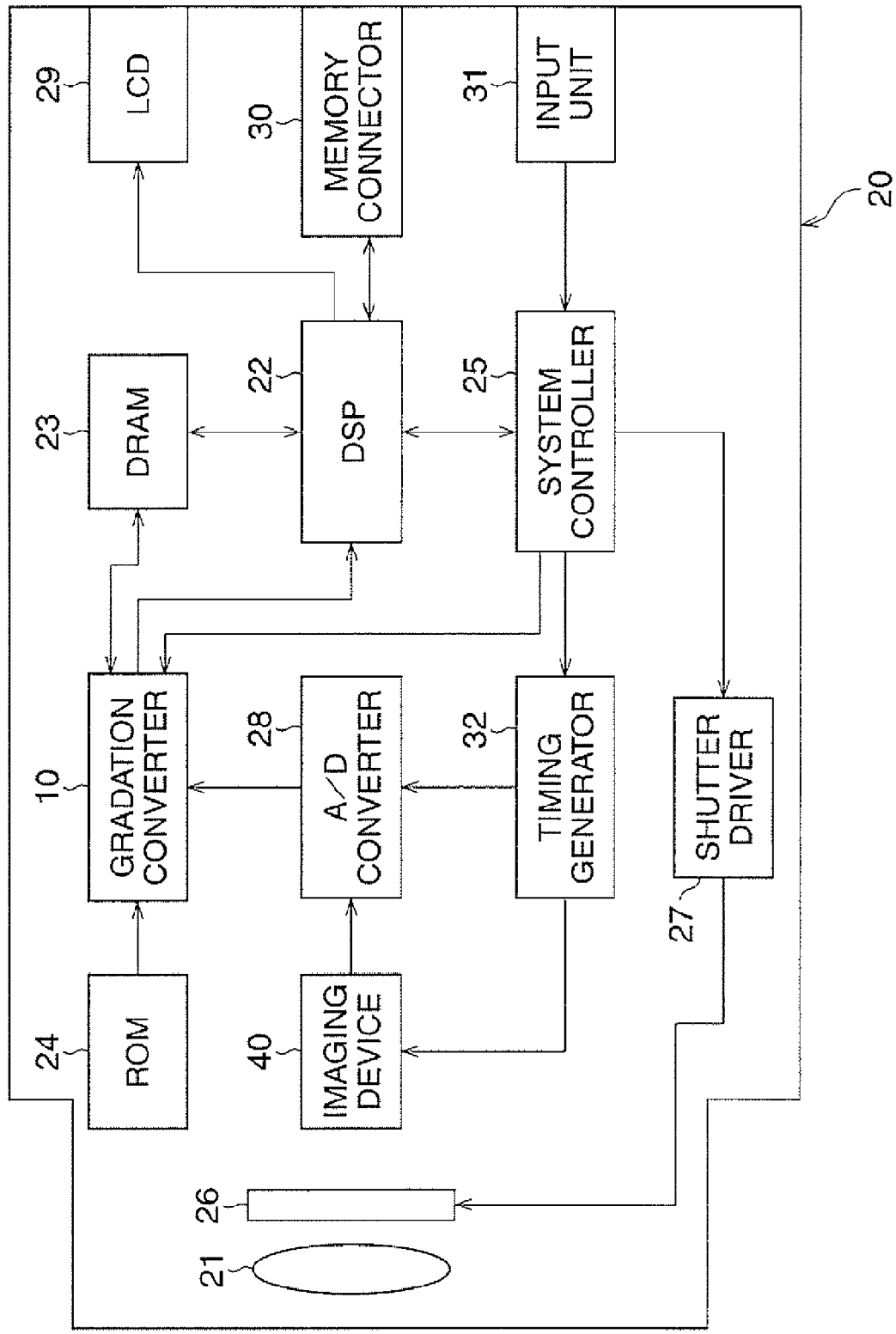
FIG. 1 is a block diagram showing the internal structure of a digital camera having an image signal processing unit of a first embodiment of the present invention.

The present invention is described below with reference to the embodiment shown in the drawings.

FIG. 1 is a block diagram showing the internal structure of a digital camera having an image signal processing unit of a first embodiment of the present invention.

In FIG. 1, a digital camera 20 comprises a lens 21, an imaging device 40, a gradation converter 10 (image signal processing unit), a digital signal processor (DSP) 22, a DRAM 23, a ROM 24, a system controller 25, and other components.

The lens 21 is optically connected to the imaging device 40. An optical image of an object through the lens 21 is incident to the light-receiving surface of the imaging device 40. The imaging device 40 is a CMOS imaging device. When the imaging device 40 captures the optical image of the object, the imaging device generates image signal(s) corresponding to the optical image.

The shutter 26 is mounted between the lens 21 and the imaging device 40. While the shutter 26 opens, the optical image is captured by the imaging device 40. A shutter driver 27 drives the shutter 26 so that the shutter can open and close.

The image signal generated by the imaging device 40 is sent to the A/D converter 28. The A/D converter 28 is a digital circuit of 12 bits. The image signal, which is an analog signal, is converted into digital signal of a signal level of 0~4095 The image signal, after being converted into digital signal, is sent to the gradation converter 10. The image signal, after being sent to the gradation converter 10, is stored by the DRAM 23, which is used as a work memory for signal processing.

The digital camera 20 has a normal photographing mode and a high-sensitivity photographing mode. When the high-sensitivity photographing mode is selected, gradation conversion processing, as described later, is carried out for the image signal, sent to the gradation converter 10. The image signal, having undergone the gradation conversion processing, is sent to the DSP 22. On the other hand, when the normal photographing mode is selected, the image signal, after being sent to the gradation converter 10, is sent to the DSP 22 without carrying out the gradation conversion processing.

Some predetermined signal processing is carried out for the image signal sent to the DSP 22. The image signal, having undergone the predetermined signal processing, is sent to an LCD 29. An image, corresponding to the image signal sent to the LCD 29, is displayed on the LCD 29. Further, the image signal, having undergone the predetermined signal processing, can be stored on a memory card (not depicted), which is connected to the DSP 22 via a memory connector 30. The memory card can be connected to and disconnected from the memory connector 30 as necessary.

The signal processing carried out by the gradation converter 10 and the DSP 22 is controlled by the system controller 25. In addition, the system controller 25 controls the entire operation of the digital camera 20.

An input unit 31 comprises a shutter button (not depicted), a manipulation dial (not depicted), and other components. The input unit 31 is connected to the system controller 25. When a user inputs some command to the input unit 31, a command signal corresponding to the command given is sent to the system controller 25.

Each component of the digital camera 20 is controlled by the system controller 25 according to a command signal. For example, when the shutter button is pushed on, the system controller 25 controls the shutter driver 27 to open or close the shutter 26. Further, the system controller 25 controls a timing generator 32 to drive the imaging device 40. The image signal is generated when the imaging device 40 is driven. In addition, the system controller 25 controls the timing generator 32 to drive the A/D converter 28. The A/D conversion of the image signal is carried out when the A/D converter 28 is driven.

Next, the structure of the light-receiving surface of the imaging device 40 is explained with reference to FIG. 2.

A plurality of pixels 41R, 41G, and 41B are arranged at the light-receiving surface in a matrix, In this embodiment, the pixels form 12 rows and 12 columns at the light-receiving surface. A first pixel 41R is covered by a red color filter element. A second pixel 41G is covered by a green color filter element. A third pixel 41B is covered by a blue color filter element. The first, second, and third pixels are arranged according to the Bayer color array. Accordingly, one first pixel 41R, two second pixels 41G, and one third pixel 41B forms a color array unit (not depicted in FIG. 2), having two rows and two columns. The color array units are arranged along the pixel row and the pixel column.

The first pixel 41R generates a pixel signal according to an amount of red light received at the first pixel 41R. The second pixel 41G generates a pixel signal according to an amount of green light received at the second pixel 41G The third pixel 41B generates a pixel signal according to an amount of blue light received at the third pixel 41R.

Pixel signals, generated by a plurality of pixels 41R, 41G, and 41B that correspond to one frame of the photographed image, form the image signal. Each pixel signal, generated by each pixel 41R, 41G and 41B, is output from the imaging device 40 separately.

Next, the structure and the function of the gradation converter 10 are explained below with reference to FIG. 3. The gradation converter 10 comprises a reception block 11, an addition block 12, a compression block 13, and a determination block 14.

The image signal, output from the A/D converter 28, is input to the reception block 11. The image signal, received by the reception block 11, is stored by the DRAM 23, as described above. The image signal, stored by the DRAM 23, is read by the addition block 12. The addition block 12 carries out addition processing for pixel signals.

Figure 2:
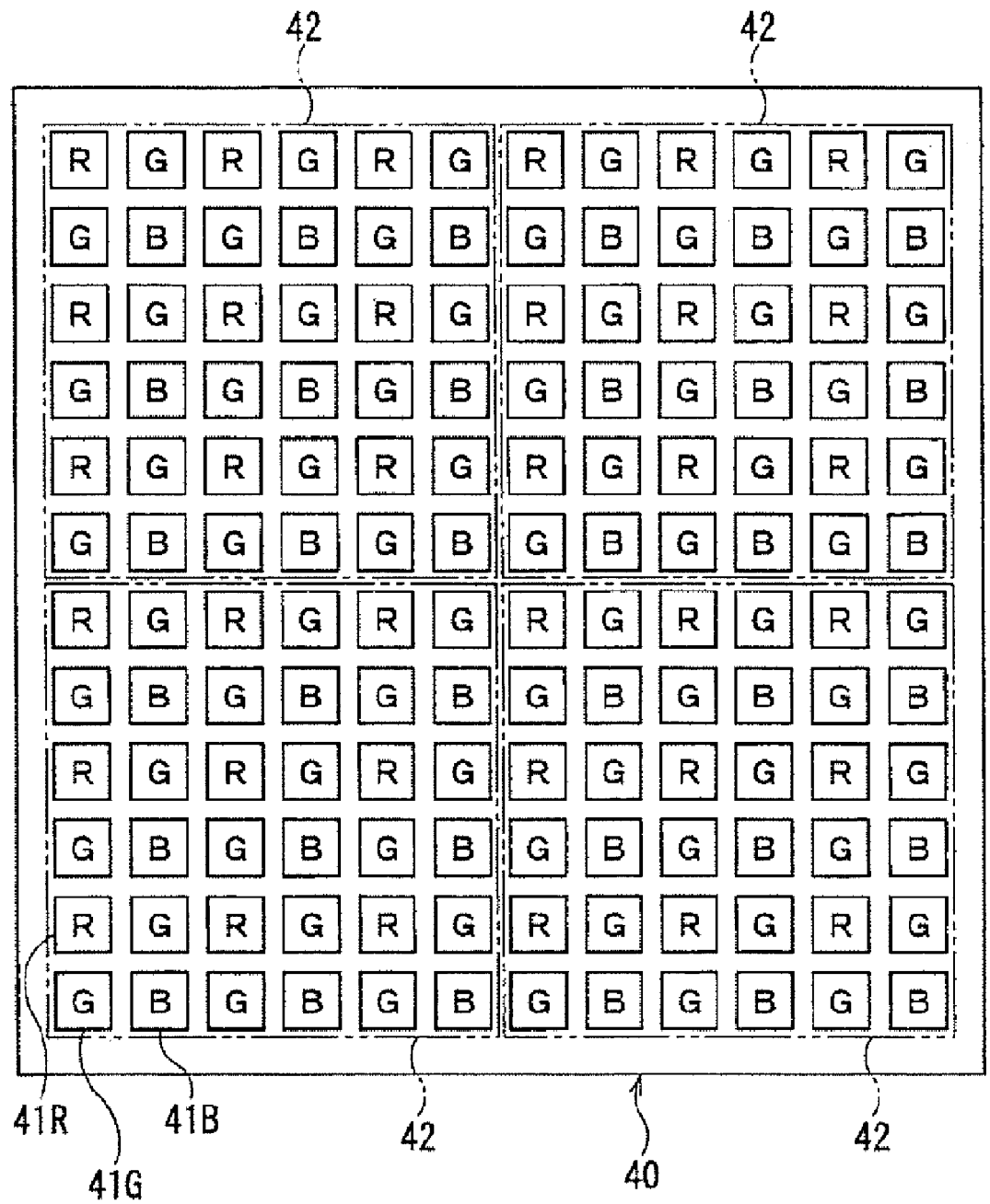
FIG. 2 illustrates the structure of a receiving surface of an imaging device.

For the addition processing, the light-receiving surface is conceptually divided into a plurality of pixel blocks 42 (see FIG. 2). In the addition processing, pixel signals, generated by pixels 41R, 41G, and 41B that are located at a predetermined position in the pixel block 42, are summed up.

The addition processing is explained in detail with reference to FIGS. 4~7. The first pixel 41R, being arranged in nth row and mth column of the pixel block 42, is referred to as Rnm. Similarly, the second pixel 41G, being arranged in nth row and mth column of the pixel block 42, is referred to as Gnm. Similarly, the third pixel 41B, being arranged in nth row and mth column of the pixel block 42, is referred to as Bnm. In addition, the pixel signal generated by the Rnm is referred to as RSnm. Similarly, the pixel signal generated by the Gnm is referred to as GSnm. Similarly, the pixel signal generated by the Bnm is referred to as Bin In the pixel block 42, there are 9 color array units 43 arranged in three rows and three columns; correspondingly, there are 36 pixels arranged in six rows and six columns (see FIGS. 4~7). An upper left position of each color array unit 43 in the pixel block 42 is decided upon as a first position (see bold outline in FIG. 4). Accordingly, a position of an odd row and an odd column in the pixel block 42 is decided upon as the first position. An upper right position of each color array unit 43 in the pixel block 42 is decided upon as a second position (see bold outline in FIG. 5). Accordingly, a position of an odd row and an even column in the pixel block 42 is decided upon as the second position. A lower right position of each color array unit 43 in the pixel block 42 is decided upon as a third position (see bold outline in FIG. 6). Accordingly, a position of an even row and an even column in the pixel block 42 is decided upon as the third position. A lower left position of each color array unit 43 in the pixel block 43 is decided upon as a fourth position (see bold outline in FIG. 7). Accordingly, a position of an even row and an odd column in the pixel block 42 is decided upon as the fourth position.

In the addition processing, pixel signals generated by the pixels at the first, second, third, or fourth positions are added up separately, described below concretely.

The pixel signals RS11, RS13, RS15, RS31, RS33, RS35, RSS51, RS53, and RS55, respectively generated by the first pixels 41R arranged in the first position R11, R13, R15, R31, R33, R35, R51, R53, and R55 are added up, and then the first high-sensitivity signal, hereinafter referred to as RS'11, is generated.

The pixel signals GS12, GS14, GS16, GS32, GS34, GS36, GS52, GS54, and GS56, respectively generated by the second pixels 41G arranged in the second position G12, C,14, G16, G32, G34, G36, G52, G54, and G56, are added up, and then the second high-sensitivity signal, hereinafter referred to as GS'12, is generated.

The pixel signals BS22, BS24, BS26, BS42, BS44, BS46, BS62, BS64, and BS66, respectively generated by the third pixels 41B arranged in the third position B22, B24, B26, B42, B44, B46, B62, B64, and B66, are added up, and then the third high-sensitivity signal, hereinafter referred to as BS'22, is generated.

The pixel signals GS21, GS23, GS25, GS41, GS43, GS45, GS61, GS63, and GS65, respectively generated by the second pixels 41G arranged in the fourth position G21, G23, G25, G41, G43, G45, G61, G63, and G65, are added up, and then the fourth high-sensitivity signal, hereinafter referred to as GS'21, is generated.

As described above, the maximum signal level of the pixel signal, converted into a digital signal of 12 bits, may be 4095. Accordingly, the maximum signal level of the first, second, third, and fourth high-sensitivity signals RS'11, GS'12, BS'22, and GS'21 may each be 9×4095.

Figure 3:
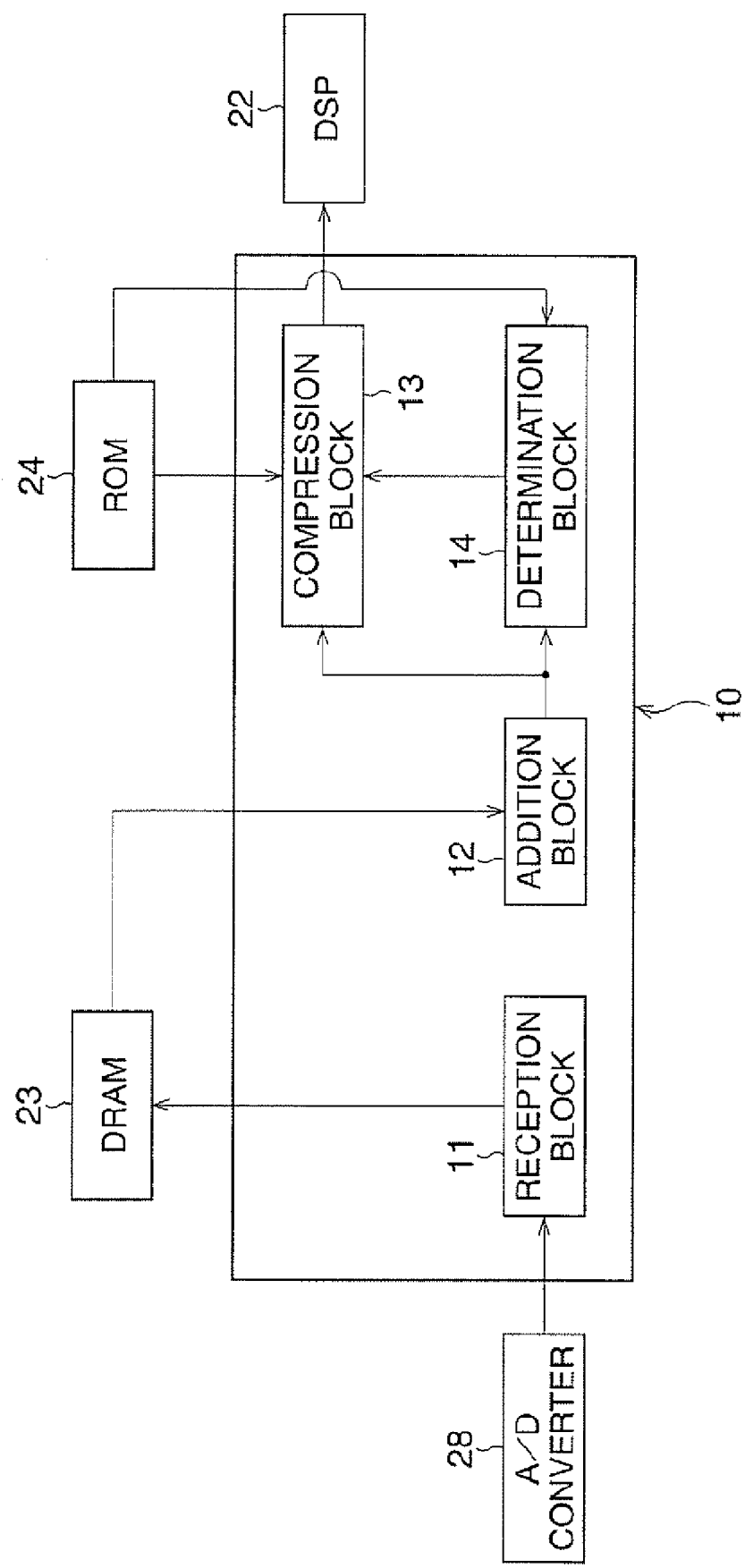
FIG. 3 is a block diagram showing the internal structure of a gradation converter of the first embodiment.
Figure 4:
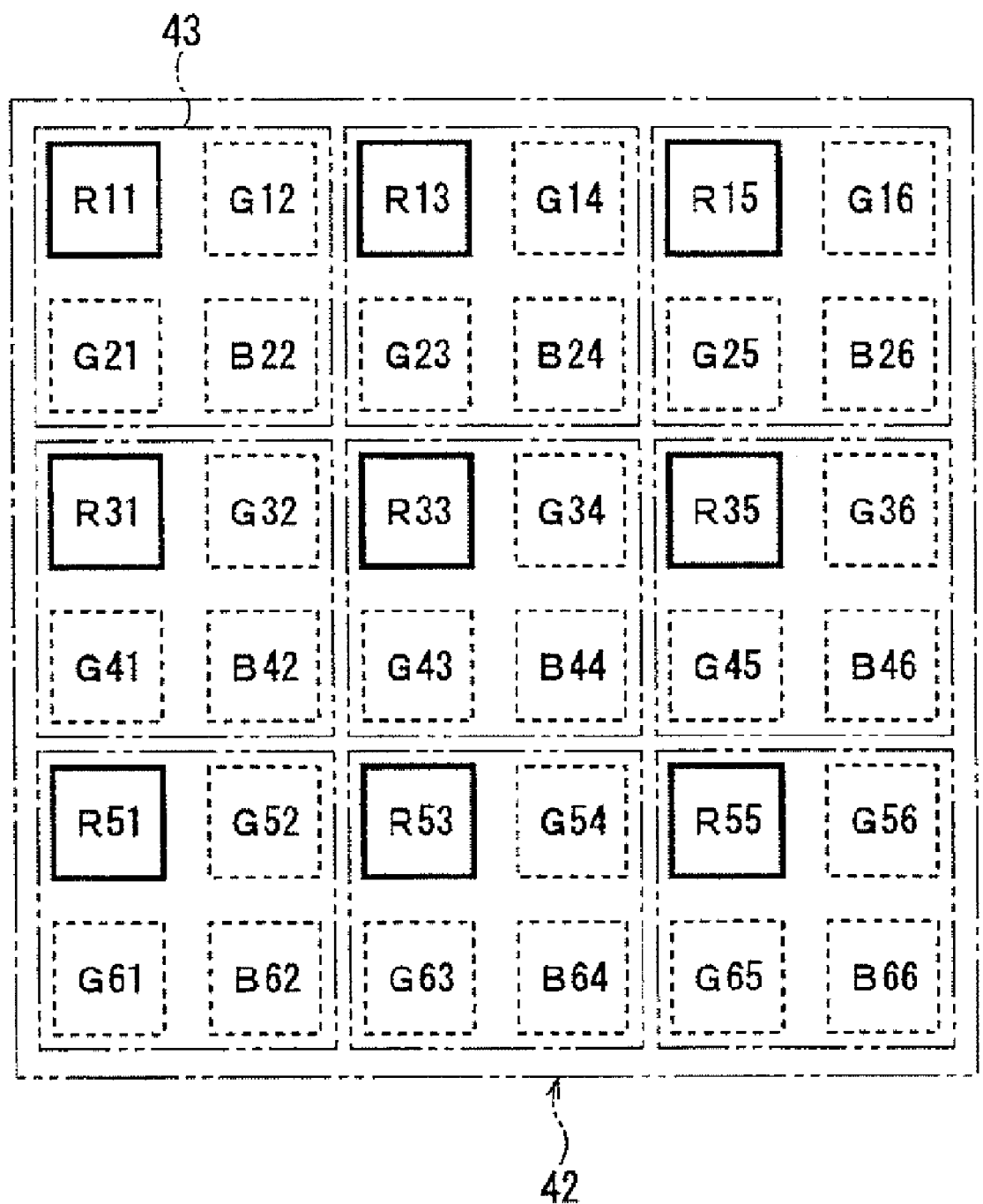
FIG. 4 illustrates an arrangement of a first position of a pixel in a single pixel block.
Figure 5:
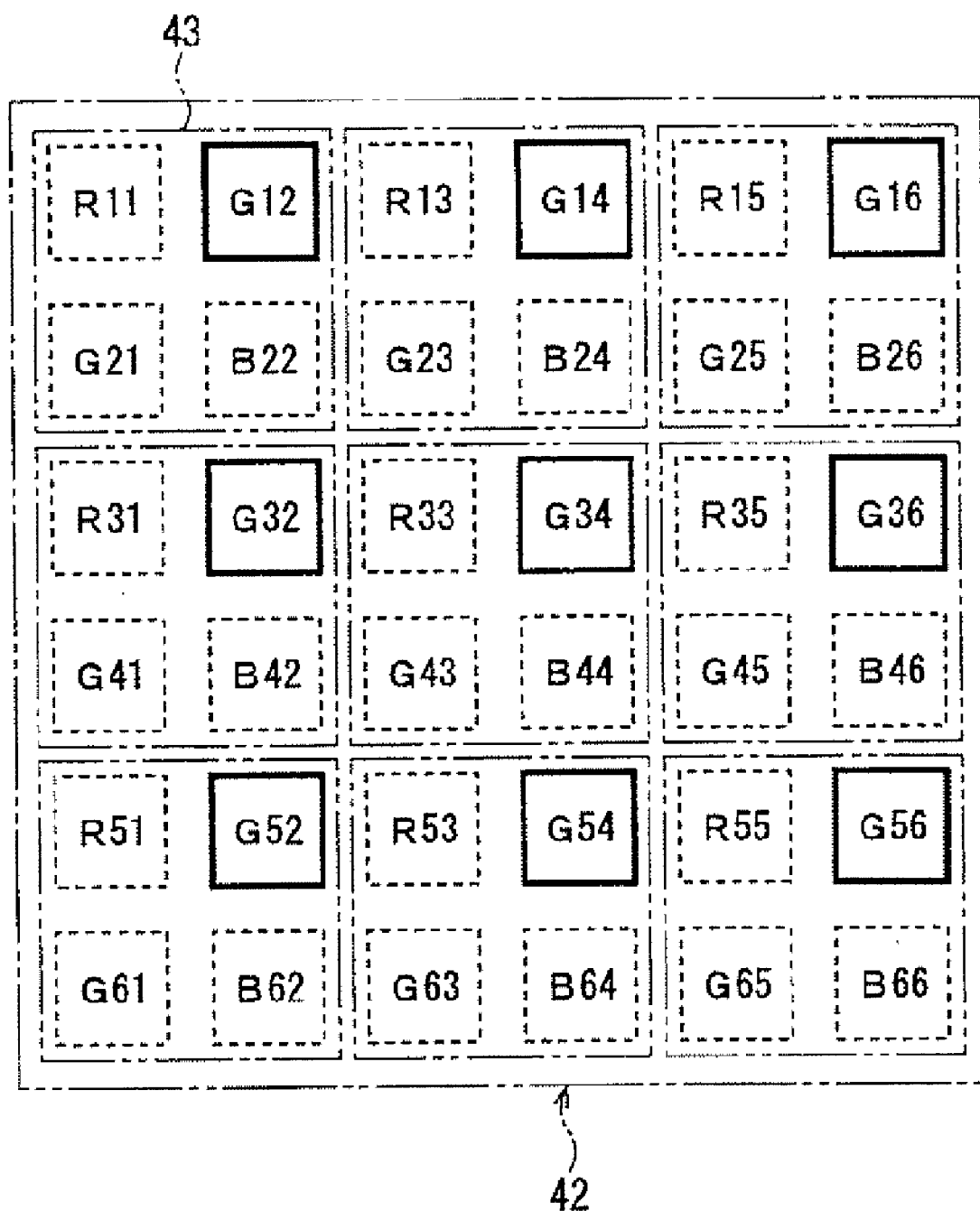
FIG. 5 illustrates an arrangement of a second position of a pixel in a single pixel block.
Figure 6:
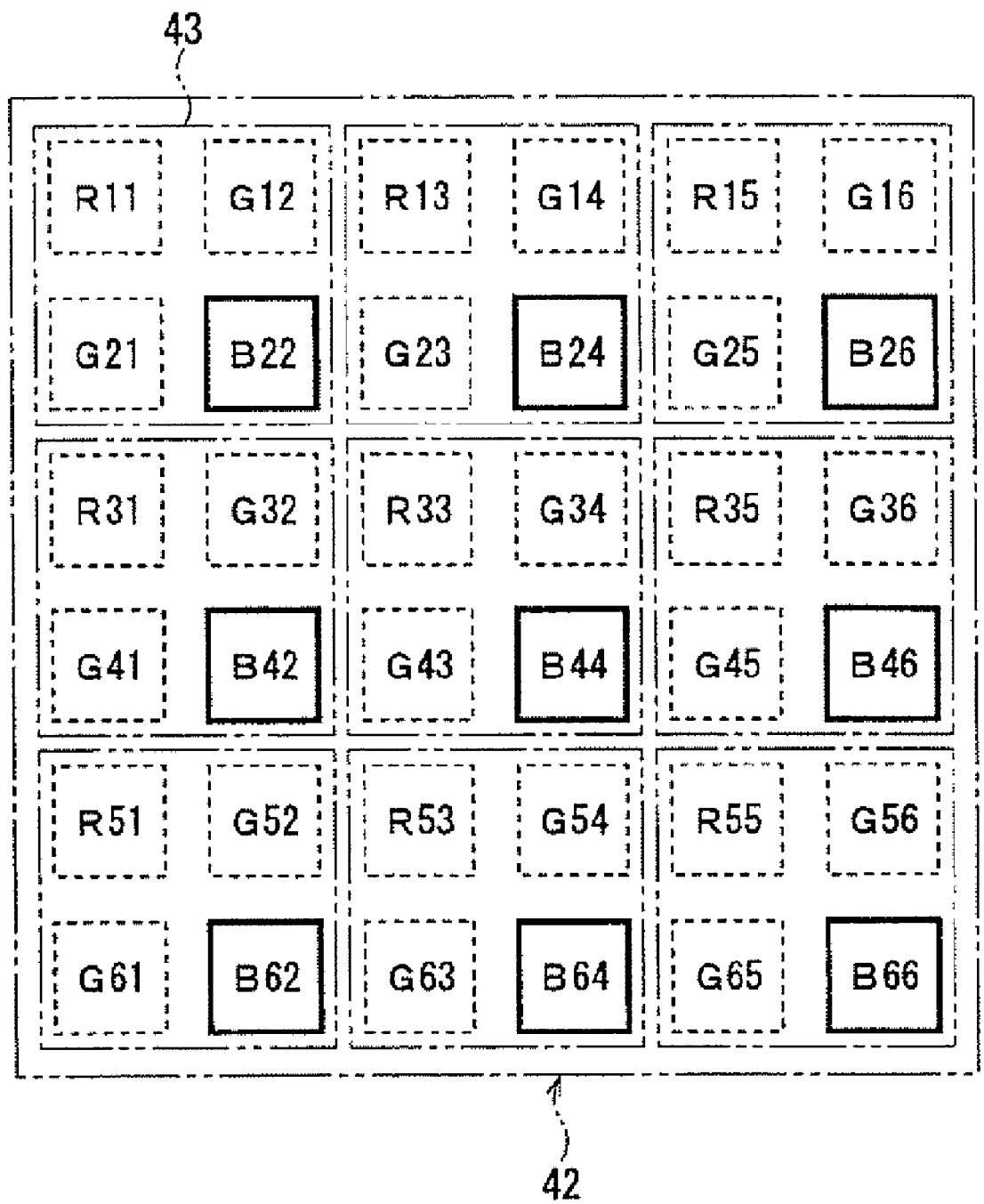
FIG. 6 illustrates an arrangement of a third position of a pixel in a single pixel block.
Figure 7:
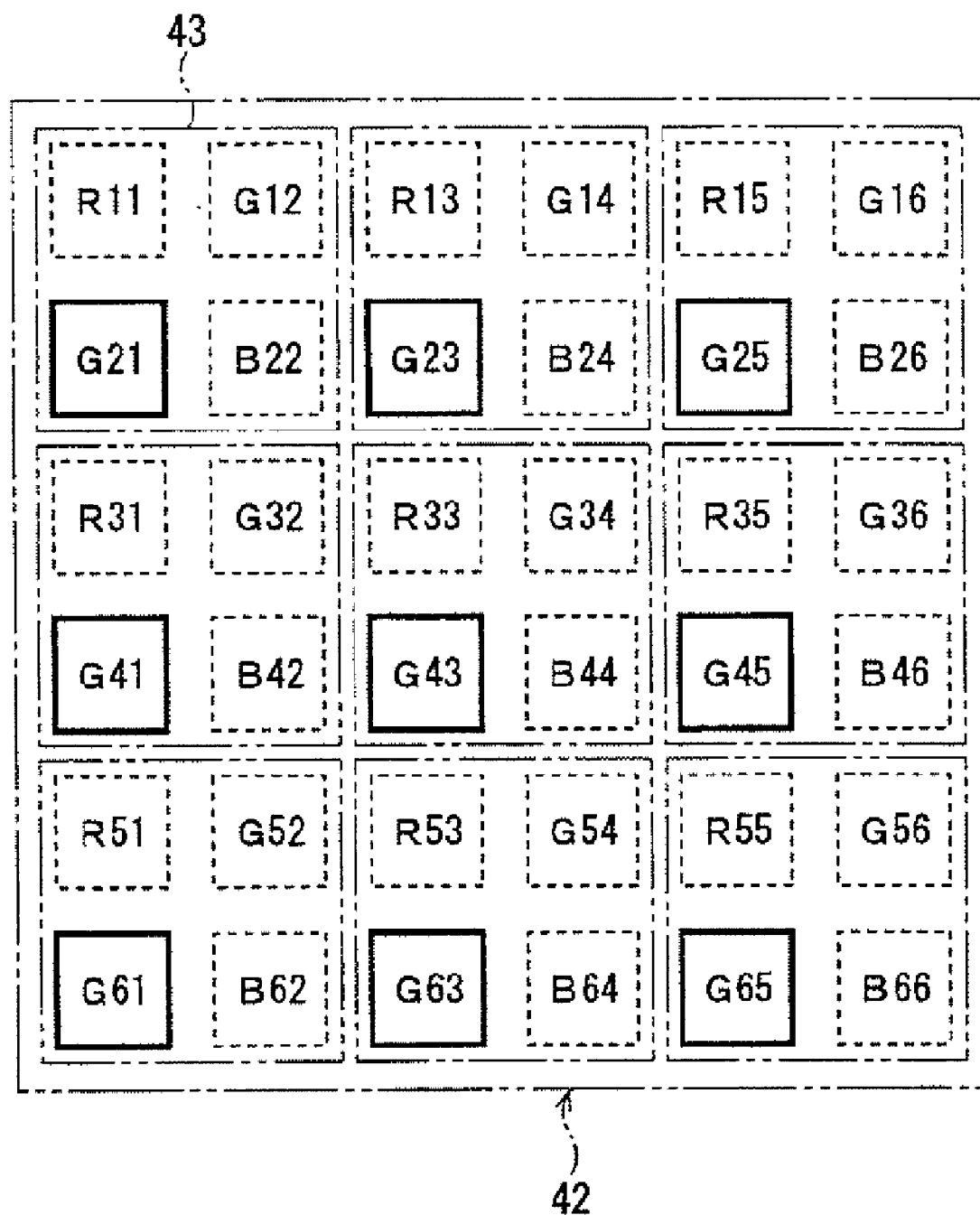
FIG. 7 illustrates an arrangement of a fourth position of a pixel in a single pixel block.

The first, second, third, and fourth high-sensitivity signals RS'11, GS'12, BS'22, and GS'21, generated by the addition block 12, are sent to the compression block 13 and the determination block 14 (see FIG. 3).

The determination block 14 determines which signal has the highest signal level among the first, second, third, and fourth high-sensitivity signals RS'11, GS'12, BS'22, and GS'21 of a pixel block 42. Then, the determined high-sensitivity signal is decided upon as a standard signal for the pixel block 42. Further, the determination block 14 divides the standard signal by 4095, which is the maximum signal level of a single pixel signal, and then a judgment signal is generated by the determination block 14. Further, the determination block 14 determines whether the signal level of the judgment signal is over a first threshold level, which is 0.7 in this embodiment. Incidentally, the first threshold level is stored in the ROM 24. The indication signal, indicating whether the signal level is over the first threshold level, and the judgment signal are sent to the compression block 13.

The compression block 13 either carries out or does not carry out the gradation conversion process based on the indication signal. When the signal level of the judgment signal is over the first threshold level, the compression block 13 carries out gradation conversion processing for the first, second, third, and fourth high-sensitivity signals RS'11, GS'12, BS'22, and GS'21 of the same pixel block 42. On the other hand, when the signal level of the judgment signal is under the first threshold level, the compression block 13 sends the first, second, third, and fourth high-sensitivity signals RS'11, GS'12, BS'22, and GS'21 (of the same pixel block 42 without carrying out the gradation conversion processing) to the DSP 22.

Figure 8:
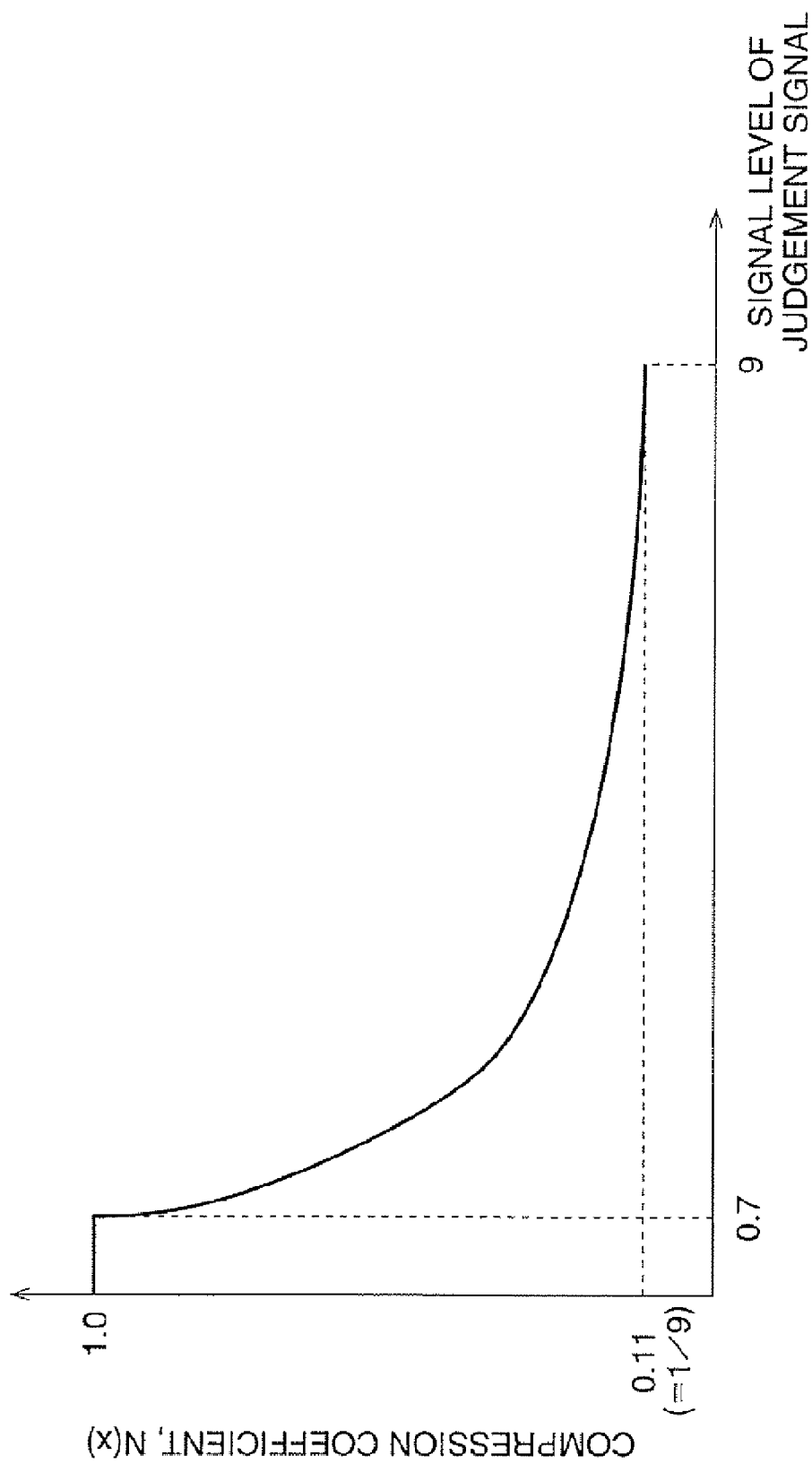
FIG. 8 is a graph showing a correlation between a signal level of a judgment signal and a compression coefficient.

A compression coefficient, hereinafter referred to as N(x), is predetermined corresponding to the signal level of the judgment signal (see FIG. 8) for the gradation conversion processing. N(x) is calculated according to the following equation (1);

$$N(x) = (x^{(-6/7)})/1.37 \tag{1}$$

In the above equation (1), x is the signal level of the judgment signal.

Corresponding table data between the N(x) calculated according to the above equation (1) and the signal level of the judgment signal is stored in the ROM 24.

When the compression block 13 carries out gradation conversion processing, the compression block 13 reads N(x) according to the signal level of the judgment signal for the pixel block 42. The compression block 13 multiplies the first high-sensitivity signal RS'11 by the read N(x). Then, a first low-sensitivity signal RS"11, of which the signal level is compressed from that of the first high-sensitivity signal RS'11, is generated. Similarly, the compression block 13 multiplies the second high-sensitivity signal GS'12 by the read N(x). Next, a second low-sensitivity signal GS"12, of which the signal level is compressed from that of the second high-sensitivity signal GS'12, is generated Similarly, the compression block 13 multiplies the third high-sensitivity signal BS"22 by the read N(x). After that a third low-sensitivity signal BS"22, of which the signal level is compressed from that of the third high-sensitivity signal BS'22, is generated. Similarly, the compression block 13 multiplies the fourth high-sensitivity signal GS'21 by the read N(x). Then, a fourth low-sensitivity signal GS"21, of which the signal level is compressed from that of the fourth high-sensitivity signal GS'21, is generated. The first, second, third, and fourth low-sensitivity signals are sent to the DSP 22.

Figure 9:
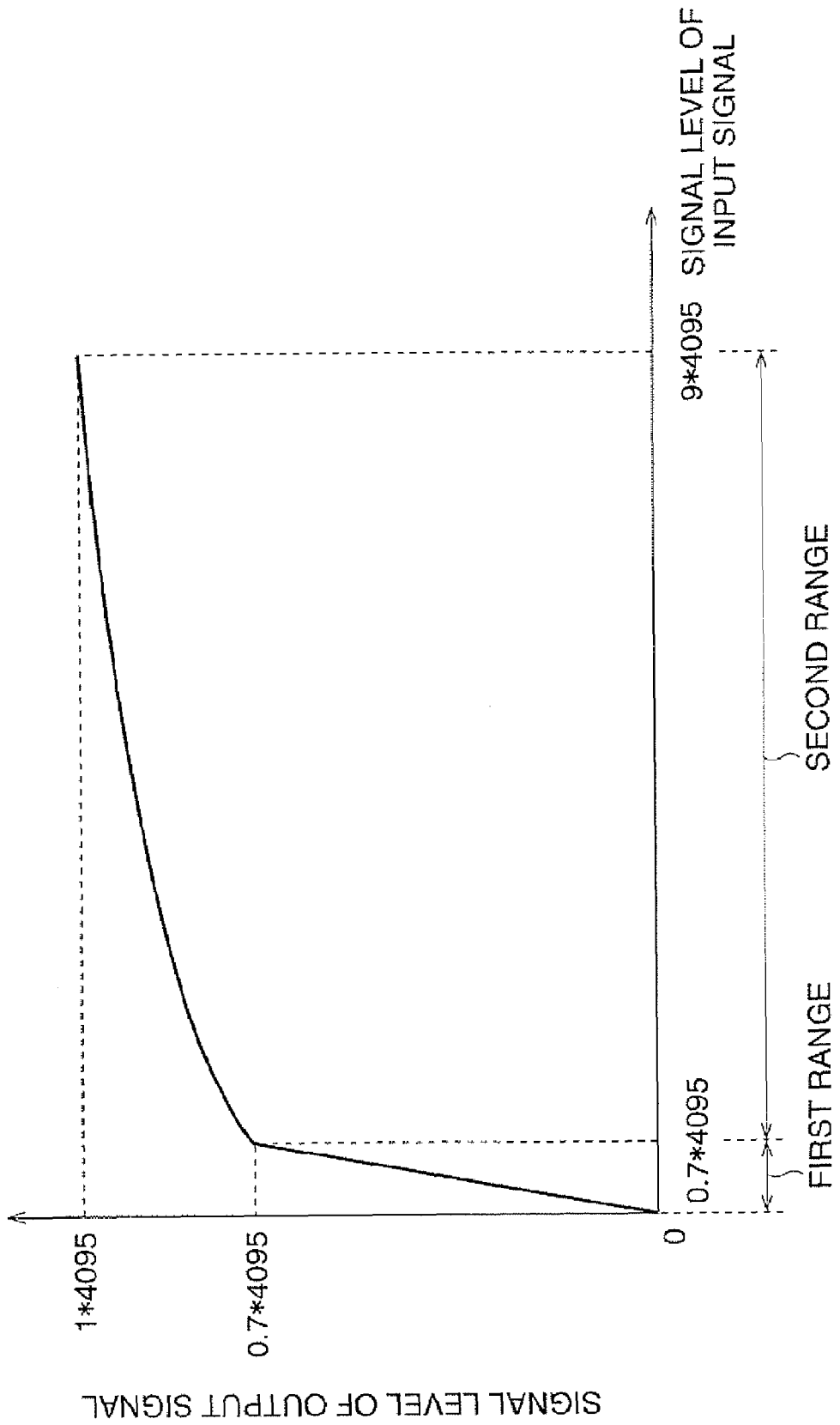
FIG. 9 is a graph showing a correlation between signal levels of the input signal and the output signal in the first embodiment.

A correlation of the signal level between the input signal that is input to the compression block 13 and the output signal that is output from the compression block 13 in the high-sensitivity photographing mode is explained with reference to FIG. 9. In FIG. 9, the horizontal axis is the signal level of the input signal and, the vertical axis is the signal level of the output signal. The input signal is equal to the high-sensitivity signal. The output signal is equal to the high-sensitivity signal when the signal level of the judgment signal is under the first threshold level. The output signal is equal to the low-sensitivity signal when the signal level of the judgment signal is over the first threshold level.

The signal level of the output signal increases according to the increase in the signal level of the input signal. However, the slope of the curve, showing the correlation of the input signal to the output signal, changes suddenly where the signal level of the input signal is 0.7×4095, corresponding to the first threshold level.

When the signal level of the input signal is in the first range between 0 and 0.7×4095, the input signal is output to the DSP 22 as the output signal. Accordingly, the signal level of the input signal is equal to the signal level of the output signal. On the other hand, when the signal level of the input signal is in the second range between 0.7×4095 and 9×4095, the input signal is compressed using a value of N(x) that is under 1, so that the signal level of the output signal is between 0.7×4095 and 1×4095.

Figure 10:
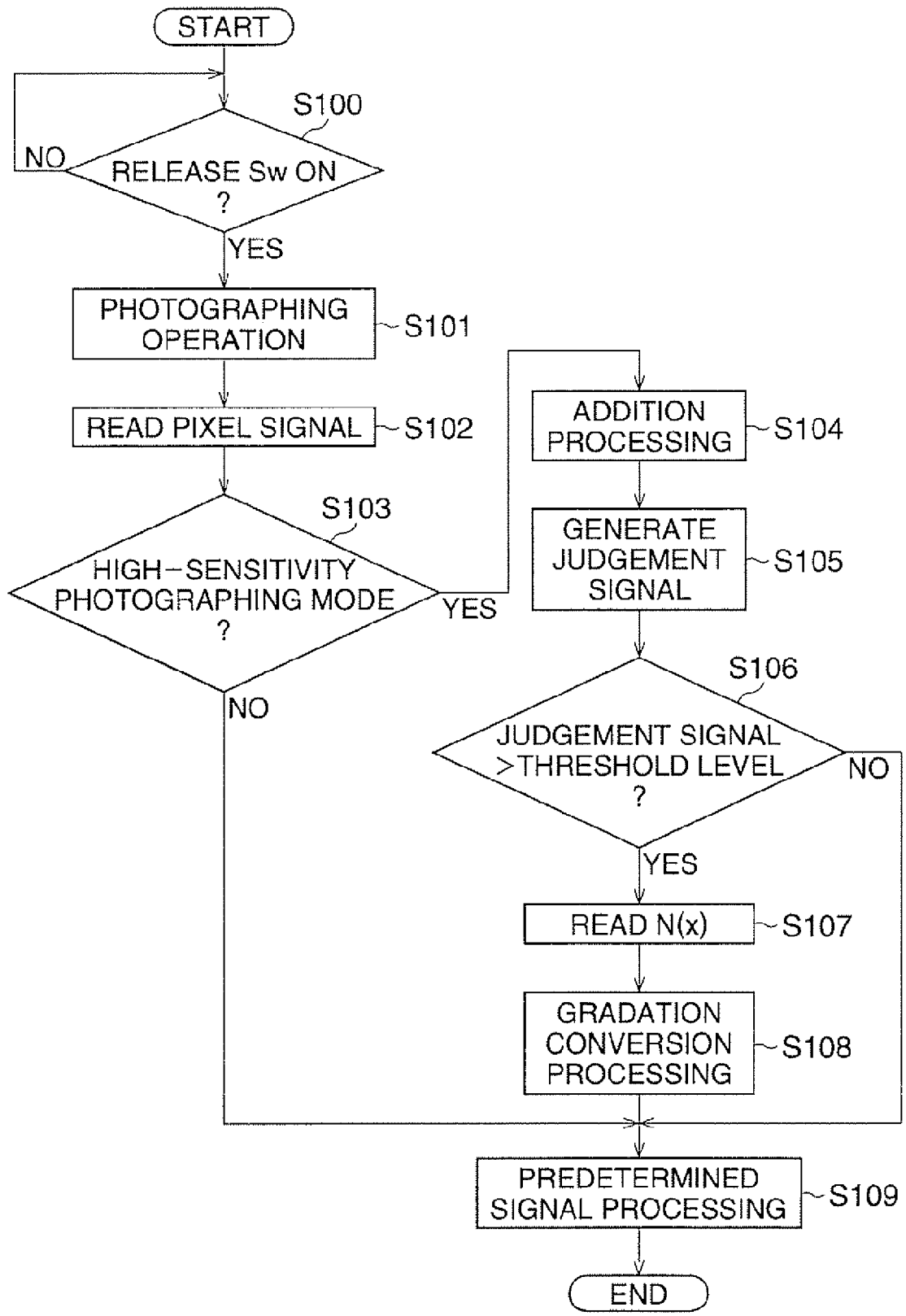
FIG. 10 is a flowchart to explaining some operations for photographing operation carried out by the digital camera in the first embodiment.

Next, some operations for photographing carried out by the digital camera in the first embodiment are explained using the flowcharts of FIG. 10.

At step S100, it is determined whether the release switch is switched on by pushing the shutter button. If the release switch is not switched on, the process returns to step S100, and step S100 is repeated until the release switch is switched on.

If the release switch is switched on, the process goes to step S101. At step S101, a photographing operation is carried out. Namely, the mirror and the shutter are caused to open and to close, and the imaging device 40 is caused to generate an image signal comprising some pixel signals generated by some pixels. The image signal is received by the gradation converter 10. Further, the DRAM 23 stores the received image signal.

At step S102, each pixel signal stored by the DRAM 23 is caused to output to the gradation converter 10. Then, the process goes to step S103.

At step S103, it is determined whether the high-sensitivity photographing mode is selected or not. If not the high-sensitivity photographing mode but the normal photographing mode is selected, the gradation converter 10 is caused to output the pixel signal to the DSP 22, and then the process goes to step S109. On the other hand, if the high-sensitivity photographing mode is selected, the process goes to step S104.

At step S104, the addition processing is carried out for each pixel block 42. Namely, the pixel signals generated by the pixels located in the first position of the pixel block 42 are added up and then the first high-sensitivity signal RS'11 is generated. The pixel signals generated by the pixels located in the second position of the pixel block 42 are added up, and then the second high-sensitivity signal GS'12 is generated. The pixel signals generated by the pixels located in the third position of the pixel block 42 are added up, and then the third high-sensitivity signal BS'22 is generated. The pixel signals generated by the pixels located in the fourth position of the pixel block 42 are added up, and then the fourth high-sensitivity signal GS'21 is generated. When the first, second, third, and fourth high-sensitivity signals are generated, the process goes to step S105.

At step S105, the judgment signal for each pixel block 42 is generated based on the first, second, third, and fourth high-sensitivity signals RS'11, GS'12, BS'22, and GS'21. Then, the process goes to step S106.

At step S106, it is determined whether the signal level of the judgment signal is over the first threshold level. If the signal level of the judgment signal is under the first threshold level, the first, second, third, and fourth high-sensitivity signals RS'11, GS'12, BS'22, and GS'21 are output to the DSP 22 without carrying out the gradation conversion processing. Then, the process goes to step S109.

At step S106, if the signal level of the judgment signal is over the first threshold level, the process goes to step S107. At step S107, the value N(x) is read for each pixel block 42 according to the signal level of the judgment signal. Then, the process goes to step S108.

At step S108, the gradation conversion processing is carried out for the first, second, third, and fourth high-sensitivity signals using the read N(x) value, and then the first, second, third, and fourth low-sensitivity signals RS"11, GS"12, BS"22, and GS"21 are generated. The generated first, second, third, and fourth low-sensitivity signals RS"11, GS"12, BS"22, and GS"21 are output to the DSP 22. Then, the process goes to step S109.

At step S109, the predetermined signal processing is carried out for the pixel signals being input at step S103, the first, second, third, and fourth high-sensitivity signals RS', GS'12, BS'22, and GS'21 being input at step S106, or the first, second, third, and fourth low-sensitivity signals RS"11, GS"12, BS"22, and GS"21 being input at step S108. The operations for photographing finish after the predetermined signal processing is finished.

In the above first embodiment, it is possible to generate image data corresponding to a clear photographed image including a bright object and a dark object without rising halation on the bright object, based on an image signal generated by an ordinary imaging device 40.

When the addition processing is carried out for the image signal, a DSP of higher number of bits than that of an A/D converter is necessary without the above gradation converter 10. For example, if the addition processing is carried out for nine pixel signals, converted to digital signal by the twelve-bit A/D converter, a sixteen-bit DSP is necessary for preventing halation. However, if the gradation converter 10 is mounted between the A/D converter and the DSP, the gradation for an object of low luminance is enlarged, and the gradation for an object of high luminance is reduced. Accordingly, the maximum signal level of a signal, having undergone the addition processing and being input to the DSP 22, can be kept equal to the maximum signal level of the pixel signal that is output from the A/D converter 28. Therefore, in the above first embodiment, the same-bit DSP as that of an A/D converter can carry out predetermined signal processing for signal input to the DSP without saturating the signal during the signal processing.

Figure 11:
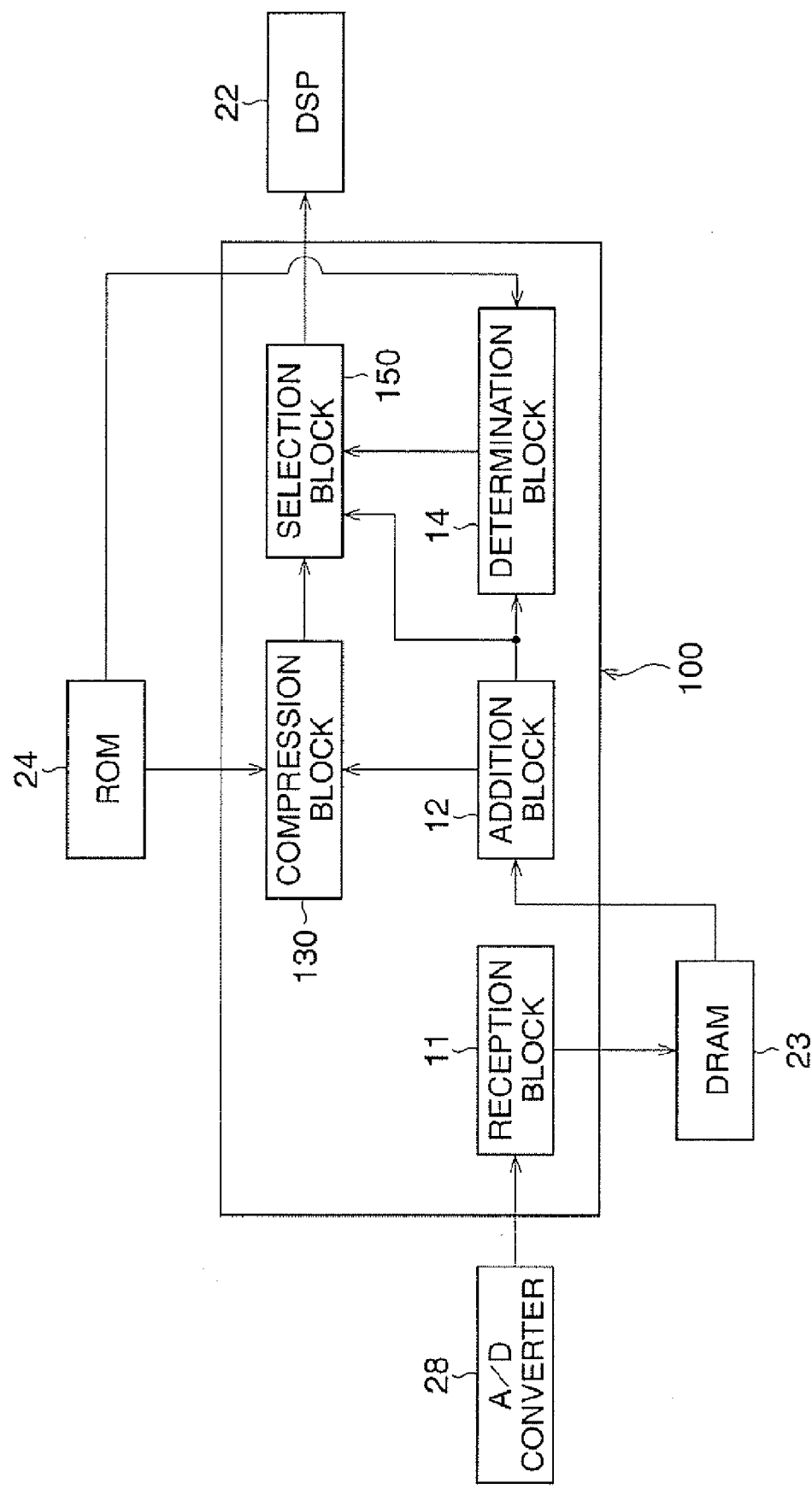
FIG. 11 is a block diagram showing the internal structure of a gradation converter of the second embodiment.

Next, the second embodiment is explained below with reference to FIG. 11. FIG. 11 is a block diagram showing the internal structure of a gradation converter that is an image signal processing unit of a second embodiment of the present invention. The same symbols are used for the structures that are the same as those in the first embodiment. The second embodiment is different from the first embodiment mainly in the structure of the gradation converter.

The gradation converter 100 comprises a reception block 11, an addition block 12, a compression block 130, and a determination block 14, in the same way as in the first embodiment. In addition, the gradation converter 100 comprises a selection block 150.

In the same way as in the first embodiment, the image signal, output from the A/D converter 28, is input to the reception block 11. Further in the same way as in the first embodiment, the image signal is read by the addition block 12 after the image signal is stored by the DRAM 23. The addition block 12 carries out the addition processing for the pixel signals.

The first, second, third, and fourth high-sensitivity signals RS'11, GS'12, BS'22, and GS'21, generated in the addition processing, are sent to the compression block 130, the determination block 14, and the selection block 150, differently from in the first embodiment.

The compression block 130 carries out the gradation conversion processing for the first, second, third, and fourth high-sensitivity signals RS'11, GS'12, BS'22, and GS'21, and generates the first, second, third, and fourth low-sensitivity signals RS"11, GS"12, BS"22, and GS"21. The gradation conversion processing is carried out independently of the signal level of the judgment signal, differently from in the first embodiment. The first, second, third, and fourth low-sensitivity signals RS"11, GS"12, BS"22, and GS"21 are sent to the selection block 150.

The determination block 14 generates the indication signal, in the same way as in the first embodiment. But the generated indication signal is not sent to the compression block, but instead sent to the selection block 150, differently from in the first embodiment.

The selection block 150 selects to output either the first, second, third, and fourth high-sensitivity signals RS'11, GS'12, BS'22, and GS'21, or the first, second, third, and fourth low-sensitivity signals RS"11, GS"12, BS"22, and GS"21, according to the indication signal. The first, second, third, and fourth low-sensitivity signals RS"11, GS"12, BS"22, and GS"21 are output to the DSP 22 when the signal level of the judgment signal is over the first threshold level. The first, second, third, and fourth high-sensitivity signals RS'11, GS'12, BS'22, and GS'21 are output to the DSP 22 when the signal level of the judgment signal is under the first threshold level.

In the above second embodiment, it is possible to output the high-sensitivity signal or the low-sensitivity signal when the signal level of the judgment signal is over or under the first threshold level, respectively. Accordingly, the second embodiment can carry out the same function as the first embodiment.

Figure 12:
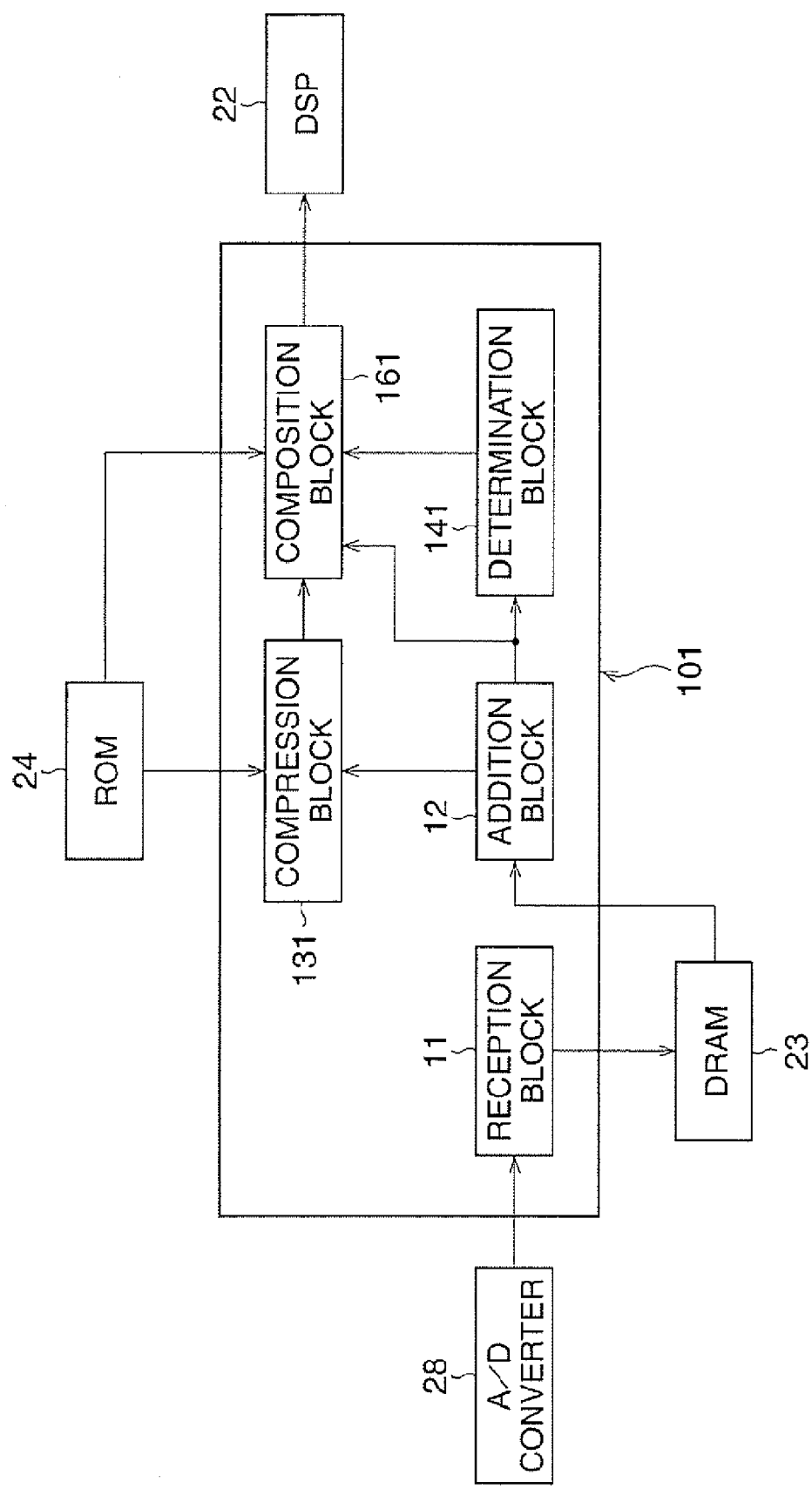
FIG. 12 is a block diagram showing the internal structure of a gradation converter of the third embodiment.

Next, the third embodiment is explained below with reference to FIG. 12. FIG. 12 is a block diagram showing the internal structure of a gradation converter that is an image signal processing unit of a third embodiment of the present invention. The same symbols are used for the structures that are the same as those in the first embodiment. The third embodiment is different from the first embodiment mainly in the structure of and the signal output from the gradation converter.

The gradation converter 101 comprises a reception block 11, an addition block 12, a compression block 131, a determination block 141, and a composition block 161.

In the same way as in the first embodiment, the image signal, output from the A/D converter 28, is input to the reception block 11. Further in the same way as in the first embodiment, the image signal is read by the addition block 12 after the image signal is stored by the DRAM 23. Further in the same way as in the first embodiment, the addition block 12 carries out the addition processing for the pixel signals included in each pixel block 42.

In the same way as in the first embodiment, the first, second, third, and fourth high-sensitivity signals RS'11, GS'12, BS'22, and GS'21, which are generated according to the addition processing, are output to the compression block 131 and the determination block 141. The first, second, third, and fourth high-sensitivity signals RS'11, GS'12, BS'22, and GS'21 are sent to the composition block 161, differently from in the first embodiment.

The compression block 131 carries out the gradation conversion processing for the first, second, third, and fourth high-sensitivity signals RS'11, GS'12, BS'22, and GS'21. A compression coefficient used for the gradation conversion processing is fixed in the third embodiment, differently from in the first embodiment. Incidentally, the fixed compression coefficient may be any positive number under one. In this embodiment, 1/16 is used as a compression coefficient.

The compression block 131 multiplies the first, second, third, and fourth high-sensitivity signals RS'11, GS'12, BS'22, and GS'21 by the fixed compression coefficient. Then, the first, second, third, and fourth low-sensitivity signals RS"11, GS"12, BS"22, and GS"21, whose signal levels are compressed from those of the first, second, third, and fourth high-sensitivity signals RS'11, GS'12, BS'22, and GS'21, are generated. The first, second, third, and fourth low-sensitivity signals RS"11, GS"12, BS"22, and GS"21 are sent to the composition block 161.

In the same way as in the first embodiment, the determination block 141 determines which signal level is the highest among the first, seconds third, and fourth high-sensitivity signals RS'11, GS'12, BS'22, GS'21 of a pixel block 42. Then, the determined high-sensitivity signal is decided upon as a standard signal for the pixel block 42.

The determination block 141 determines whether the signal level of the standard signal is over a second threshold level, differently from in the first embodiment. The indication signal, indicating whether the signal level is over the second threshold level, is sent to the compression block 161. Incidentally, the second threshold level is stored in the ROM 24.

The composition block 161 adds one of the high-sensitivity signal and the threshold signal corresponding to the second threshold level to the low-sensitivity signal. The high-sensitivity signal of the same pixel block 42 is added to the low-sensitivity signal if the signal level of the standard signal is under the second threshold level On the other hand, the threshold signal is added to the low-sensitivity signal if the signal level of the standard signal is over the second threshold level. A composite signal that is computed by the composition block 161 is output to the DSP 22.

Figure 13:
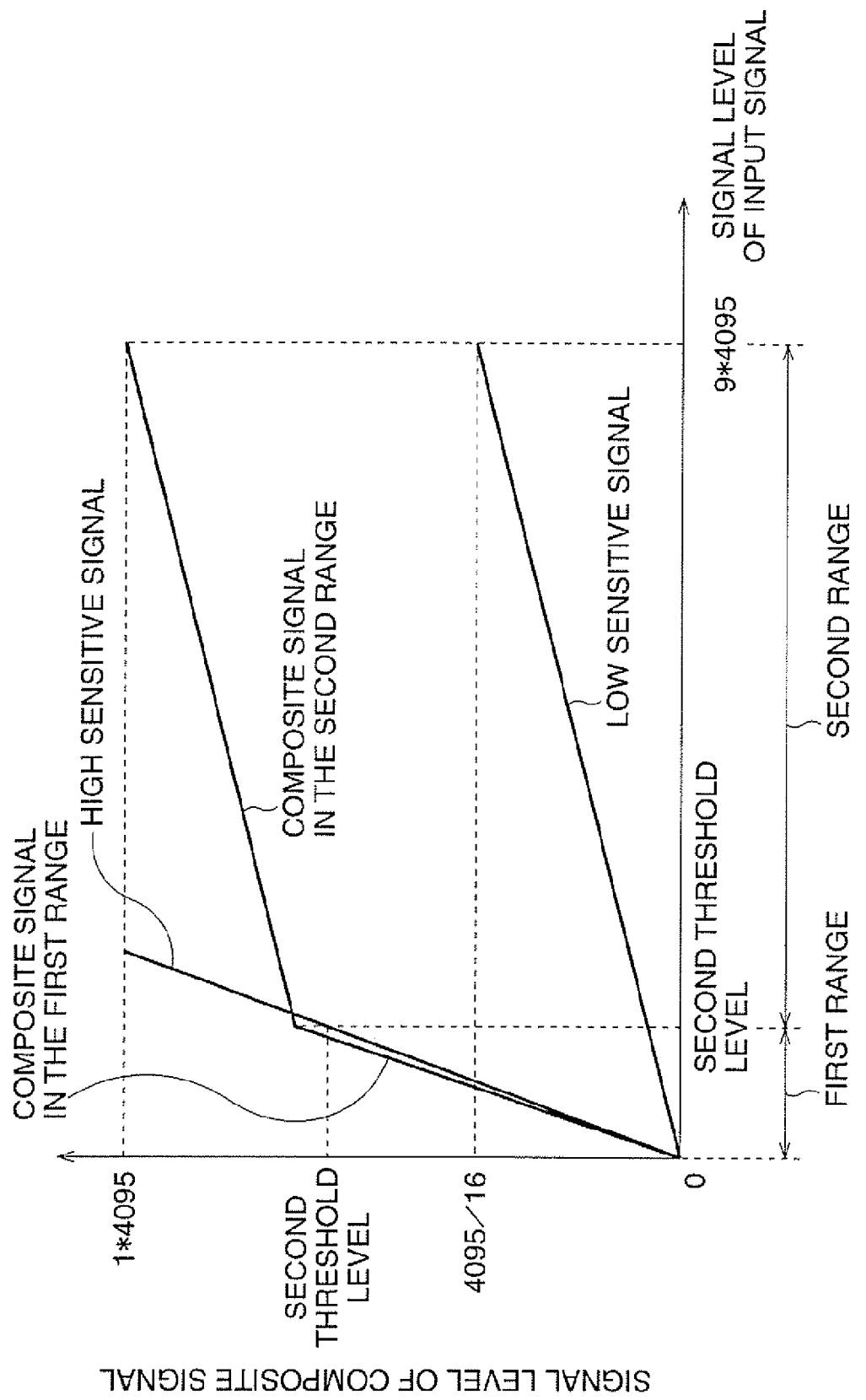
FIG. 13 is a graph showing a correlation between signals level of the input signal and composite signal in the third embodiment.

A correlation of the signal level of the input signal that is input to the compression block 131 to the signal level of the output signal that is output from the composite block 161 in the high sensitivity photographing mode is explained with reference to FIG. 13. In FIG. 13, the horizontal axis is the signal level of the input signal and the vertical axis is the signal level of the output signal.

The signal level of the output signal increases according to the increase of the signal level of the input signal. However, the slope of the curve showing the correlation of the input signal to the output signal radically changes where the signal level of the input signal is at the second threshold level.

If the signal level of the input signal is in the first range between 0 and the second threshold level, the composite signal that is generated by adding the high-sensitivity signal to the low-sensitivity signal is output to the DSP 22. On the other hand, if the signal level of the input signal is in the second range between the second threshold level and 9×4095, the composite signal that is generated by adding the second threshold level to the low-sensitivity signal is output to the DSP 22.

Figure 14:
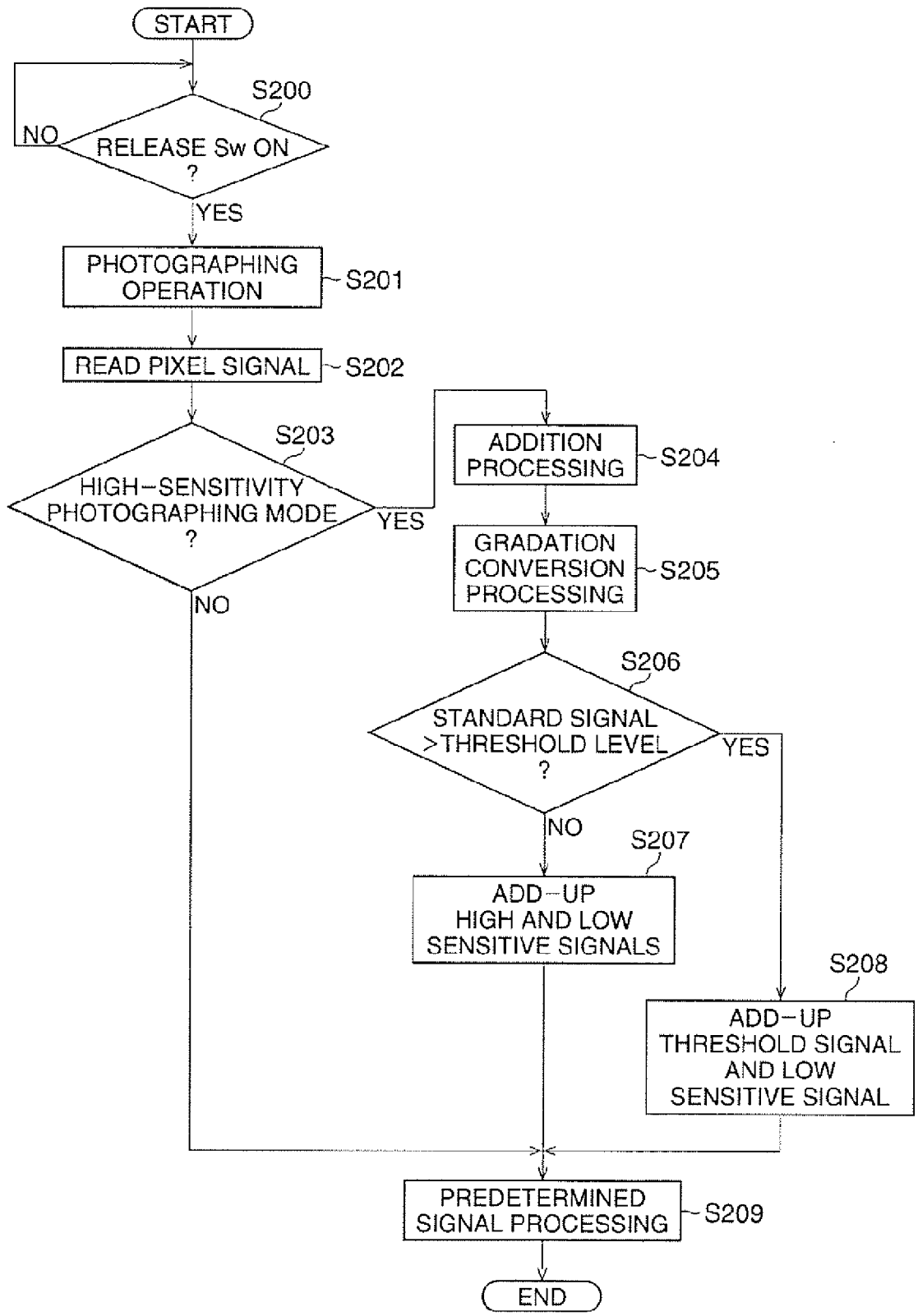
FIG. 14 is a flowchart to explaining some operations for photographing carried out by the digital camera in the third embodiment.

Next, some operations for photographing carried out by the digital camera in the third embodiment are explained using the flowcharts of FIG. 14.

At step S200~step S204, the same operations are carried out as those of step S100~step S104 in the first embodiment, respectively. The high-sensitivity signal is generated at step S204, and then the process goes to step S205.

At step S205, the gradation conversion processing is carried out for the high-sensitivity signal, and then the low-sensitivity signal is generated by the above processing At step S206, it is determined whether the signal level of the standard signal is over the second threshold level. If the signal level of the standard signal is under or equal to the second threshold level, the process goes to step S207. At step S207, the high-sensitivity signal is added to the low-sensitivity signal. The composite signal that is generated by adding the high-sensitivity signal to the low-sensitivity signal is output to the DSP 22. Then, the process goes to step S209.

At step S206, if the signal level of the standard signal is over the second threshold level, the process goes to step S208, At step S208, the threshold signal is added to the low-sensitivity signal. The composite signal that is generated by adding the threshold signal to the low-sensitivity signal is output to the DSP 22. Then, the process goes to step S209.

At step S209, the predetermined signal processing is carried out for the pixel signals being input at step S203, the composite signals being input at step S207, or the composite signals being input at step S208. The operations for photographing end after the predetermined signal processing is finished.

In the above third embodiment, it is possible to generate image data corresponding to a photographed optical image including a bright object and a dark object clearly without rising halation on the bright object, based on the image signal generated by an ordinary imaging device 40.

In addition, the same bit DSP as that of an A/D converter can carry out predetermined signal processing for a signal input to the DSP without saturating the signal during the signal processing.

The addition processing and the gradation conversion processing are carried out for the image signal generated by the color imaging device 40 that is covered with some color filters in the first, second, and third embodiments. However, their processes can be carried out for the image signal generated by the monochrome imaging device that is not covered with any color filters. The same function as that in the first, the second, and the third embodiments is shown even if such a monochrome imaging device is used.

N(x) is calculated using the signal level of the judgment signal according to equation (1) in the first and the second embodiments. However, the N(x) that can satisfy the following condition is adaptable for the first embodiment. The first condition is that N(x) be lower than 1/ (the number of pixels for addition in one pixel block 42) when the signal level of the judgment signal is equal to the number of the pixels for addition. Further, the second condition is that the product of the multiplication of N(x) and the judgment signal increases proportionally as the signal level of the judgment signal increases from the first threshold level to the number of pixels for adding-up in one pixel block 42 (see the second range of FIG. 9). Incidentally, it is preferable that N(x) be one essentially when the signal level of the judgment signal agrees with the first threshold level for quick calculation.

The judgment signal is generated and the signal level of the judgment signal is compared with the first threshold level in the first and the second embodiments. However, the signal level of the standard signal can be compared with another threshold level that is equal to the first threshold level multiplied by 4095, which is the highest value of the signal level of the pixel signal.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2005-312622 (filed on Oct. 27, 2005), which is expressly incorporated herein, by reference, in its entirety.

The invention claimed is:

1. An image signal processing unit, comprising:
   an image signal receiver that receives an image signal generated by an imaging device that has a plurality of pixels generating pixel signal according to the amount of received light, and whose receiving surface is divided into a plurality of pixel blocks where a plurality of said pixels are arranged;
   a first addition block that generates high-sensitivity signal by adding up said pixel signals generated by a plurality of said pixels arranged at a predetermined position in said pixel block;
   a compression block that generates low-sensitivity signal, whose signal level is larger than a first threshold level and that increases in proportion to increasing said high-sensitivity signal, by compressing said high-sensitivity signal for each of said pixel blocks so that said low-sensitivity signal is smaller than a maximum signal level of said pixel signal; and
   a determination block that determines whether a signal level of said high-sensitivity signal is over said first threshold level;
   said low-sensitivity signal being output if a signal level of said high-sensitivity signal is over said first threshold level, or said high-sensitivity signal being output if a signal level of said high-sensitivity signal is under said first threshold level.

2. An image signal processing unit according to claim 1, wherein said compression block generates said low-sensitivity signal by multiplying said high-sensitivity signal by a compression coefficient that decreases inversely as the signal level of said high-sensitivity signal increases.

3. An image signal processing unit according to claim 1, wherein said compression block generates said low-sensitivity signal by compressing said high-sensitivity signal when a signal level of said high-sensitivity signal is over said first threshold level.

4. An image signal processing unit according to claim 1, wherein
   said pixel is one of a first, second, or third pixel covered by a first, second, or third color filter, respectively,
   a plurality of said first, second, and third pixels are arranged in first, second, and third predetermined positions, respectively, in said pixel block,
   said first addition block generates a first, second, and third high-sensitivity signal by adding up said pixel signals generated by a plurality of said first pixels arranged at said first predetermined position, said pixel signals generated by a plurality of said second pixels arranged at said second predetermined position, and said pixel signals generated by a plurality of said third pixels arranged at said third predetermined position respectively,
   said determination block determines which is the highest signal level among said first, second, and third high-sensitivity signals, decides upon said determined high-sensitivity signal as a standard signal for said pixel block, and determines whether a signal level of said standard signal is over said first threshold level,
   said compression block generates first, second, and third low-sensitivity signals by compressing said first, second, and third high-sensitivity signals, respectively, so that said compressed high-sensitivity signal decided as said standard signal is lower than a maximum signal level of said pixel signal, and
   said first, second, and third low-sensitivity signals are output if a signal level of said standard signal is over said first threshold level, or said first, second, and third high-sensitivity signals are output if a signal level of said standard signal is under said first threshold level.

5. An image signal processing unit according to claim 4, wherein said compression block generates said first, second, and third low-sensitivity signals by multiplying said first, second, and third high-sensitivity signals, respectively, by a compression coefficient that decreases inversely as a signal level of said standard signal increases.

6. An image signal processing unit according to claim 4, wherein said compression block generates said first, second, and third low-sensitivity signals by compressing said first, second, and third high-sensitivity signals when a signal level of said standard signal is over said first threshold level.

7. An image signal processing unit, comprising:
   an image signal receiver that receives an image signal generated by an imaging device that has a plurality of pixels generating pixel signal according to the amount of received light on said receiving surface, and whose receiving surface is divided into a plurality of pixel blocks, where a plurality of said pixels are arranged;
   a first addition block that generates a high-sensitivity signal by adding up said pixel signals generated by a plurality of said pixels arranged at a predetermined position in said pixel block;
   a compression block that generates a low-sensitivity signal, which increases proportionately to increasing said high-sensitivity signal, by compressing said high-sensitivity signal for each of said pixel blocks, so that a maximum signal level of said low-sensitivity signal is lower than a remainder of the difference between a maximum signal level of said pixel signal and a second threshold level; and a second addition block that adds up said high-sensitivity signal and said low-sensitivity signal when a signal level of said high-sensitivity signal is under said second threshold level, adds up said low-sensitivity signal and the threshold signal corresponding to said second threshold level when a signal level of said high-sensitivity signal is over said second threshold level.

8. An image signal processing unit according to claim 7, wherein said compression block generates said low-sensitivity signal by multiplying said high-sensitivity signal by a compression coefficient fixed to be lower than one.

* * * * *